United States Patent
Chen et al.

(10) Patent No.: US 6,417,284 B1
(45) Date of Patent: Jul. 9, 2002

(54) ADHESION PRIMING COMPOSITION FOR FLUOROPOLYMER COATINGS

(75) Inventors: Jiann-Hsing Chen, Fairport; Biao Tan, Rochester; Joseph A. Pavlisko, Pittsford; Robert A. Lancaster, Hilton; Craig M. Cody, Scottsville, all of NY (US)

(73) Assignee: NexPress Solutions LLC, Rochester, NY (US)

( * ) Notice: Subject to any disclaimer, the term of this patent is extended or adjusted under 35 U.S.C. 154(b) by 0 days.

(21) Appl. No.: 09/409,291

(22) Filed: Sep. 30, 1999

(51) Int. Cl.$^7$ ................................................ C08F 14/18
(52) U.S. Cl. .................... 525/326.4; 525/179; 525/180; 525/166; 525/185; 525/199; 525/240; 525/241; 428/40.7; 428/351; 428/352; 428/353
(58) Field of Search ................................ 428/40.7, 351, 428/352, 353; 525/179, 180, 166, 185, 199, 240, 241, 326.4

(56) References Cited

U.S. PATENT DOCUMENTS

| 4,087,394 | A | | 5/1978 | Concannon |
| 5,411,779 | A | | 5/1995 | Nakajima et al. |
| 5,478,434 | A | | 12/1995 | Kerr et al. |
| 5,880,205 | A | * | 3/1999 | Tannenbaum ................ 524/520 |

FOREIGN PATENT DOCUMENTS

EP 0482613 A1 * 10/1991 ............ B05D/1/20

OTHER PUBLICATIONS

Principles of Polymerization, 2nd Ed., George Odian, pp. 153–154, John Wiley & Sons, Inc..
Textbook of Polymer Science, 3rd Ed., Fred W. Billmyer, Jr., pp. 427–428, John Wiley & Sons, Inc.

* cited by examiner

Primary Examiner—James J. Seidleck
Assistant Examiner—Melanie Bissett

(57) ABSTRACT

A release coating layer comprising a continuous phase of an organic polymer binder; a discontinuous phase of a fluorinated resin having a molecular weight between 2500 and 10,000,000, wherein the ratio of organic polymer binder to fluorinated resin is between 60:39.9 to 80:18 by weight; and a priming agent composition comprising a perfluoroalkyl-substituted fluororesin-reactive compound having the formula:

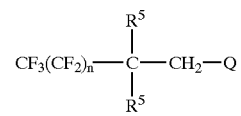

where $R^5$ is H or F, Q is OH, $SiR^6R^7R^8$, $R^6$, $R^7$, and $R^8$ being independently selected from the group consisting of Cl, OH, an alkyl group containing 1 to about 4 carbon atoms, an alkoxy group containing 1 to about 4 carbon atoms, an acyloxy group containing 2 to about 4 carbon atoms, and an amino group containing 0 to about 4 carbon atoms; and n is an integer from 1 to about 15; with the proviso that, at least one of $R^6$, $R^7$, and $R^8$ is Cl, OH, or an alkoxy, acyloxy, or amino group.

8 Claims, No Drawings

ADHESION PRIMING COMPOSITION FOR FLUOROPOLYMER COATINGS

CROSS REFERENCE TO RELATED APPLICATIONS

Reference is made to commonly assigned U.S. patent application Ser. No. 09/409,962, filed, Sep. 30, 1999, now abandoned, entitled "Laminator Member with Fluorocarbon Silane Coupling Agent" by Jiann-Hsing Chen, Biao Tan, Joseph A. Pavlisko, Robert A. Lancaster, and Craig M. Cody; and U.S. patent application Ser. No. 09/408,693, filed Sep. 30, 1999, now abandoned, entitled "A Coated Laminator Member for Color Proofing and Methods of Making Same" by Biao Tan, Joseph A. Pavlisko, Mary Ellen O'Neill, Robert A. Lancaster, and Charles E. Hewitt, the disclosures of which are incorporated herein.

FIELD OF THE INVENTION

The present invention relates to an improved fluoropolymer coating with a new adhesion priming composition.

BACKGROUND OF THE INVENTION

Fluorocarbon coatings are widely used by industry to provide a low surface energy, solvent resistance and heat resistance properties. Examples of such coatings include PTFE, FEP, PFA (or Kalrez™), Nafion™, and Telflon™, etc. Due to the inherent non-stick property of the fluorocarbonpolymer, the coating mixture requires organic polymer binders, such as polyamide-imide. Various commercially coating mixtures are available for coating on variety of substrates, especially metal or plastics. An important such fluoropolymer coating applications is in the area of color proofing lamination applications.

Prepress color proofing is a procedure that is used by the printing industry for creating representative images of printed material to check for color balance and other important image quality control parameters, without the high cost and time that is required to actually produce printing plates and set up a printing press to produce an example of an intended image. These intended images may require several corrections and may be reproduced several times to satisfy or meet the requirements of the customers, resulting in a large loss of profits and ultimately higher costs to the customer.

Generally speaking, color proofs sometimes called "off press" proofs or prepress proofs, are one of three types: namely (1) a color overlay that employs an image on a separate base for each color; (2) a single integral sheet process in which the separate color images are transferred by lamination onto a single base; and (3) a digital method in which the images are produced directly onto or transferred by lamination onto a single base from digital data.

In one typical process for a prepress color proofing system used in the printing industry, a multicolor original is separated into individual transparencies, called color separations, the three subtractive primaries and black. Typically a color scanner is used to create the color separations and in some instances more than four-color separations are used. The color separations are then used to create a color proof sometimes called an "off press" proof or prepress proof as described above.

A KODAK Color Proofing Laminator can be used to bond lamination sheets to receiver stock as a part of a color proofing system. The lamination sheets include a carrier and a layer of material to be applied to the receiver stock, which, in the case of the Kodak Color Proofing Laminator, is a color donor. A lamination sheet is laid upon the receiver stock with the color donor side sandwiched between the carrier and the receiver stock forming a lamination sandwich.

FIG. 1 in U.S. Pat. No. 5,478,434 shows a laminator 12. As shown in that FIG. 1, a lamination sandwich 10 sits on an entrance table 20. A leading edge of lamination sandwich 10 is fed into a laminator 12 that includes an upper heated pressure roller and a lower heated pressure roller. Lamination sandwich 10 passes completely through the upper heated pressure roller and the lower heated pressure roller. Lamination sandwich 10 thereafter exits the upper heated pressure roller and the lower heated pressure roller and comes to rest on an exit table 14 undisturbed until the trailing edge is cool to the touch; whereupon the top-most carrier can be peeled away from receiver stock and from the transferred color donor. With the configuration of an upper heated pressure roller and a lower heated pressure roller as described above, the laminator is called a straight-through laminator. Further details of this type of lamination/delamination system can be found in the above. As an additional reference, U.S. Pat. No. 5,203,942 describes a lamination/delamination system as applied to a drum laminator.

U.S. patent application Ser. No. 09/1 33,243 filed Aug. 13, 1998, now abandoned, provides for belt roller arrangement which applies a tapering pressure to a lamination sandwich (hereinafter referred to as media to be laminated), and conveys the media to be laminated to a nip portion between heated pressure rollers. The belt materials used are either metal or thermoplastics. In addition, the belts need to survive cycled heat and pressures and preferably, to be seamless polyimide belts. However, the high surface energy of the polyimide belts pickup dirt, dusts or contamination from the media. The polyimide belt failed to release the media during usage. There is a need for an overcoat with desired heat resistance and release properties.

One commercially available polymer for lamination belt overcoat is polytetrafluoroethylene (PTFE) from Whitford. This overcoat provides a low surface energy surface to help release the media. However, within few hours of heating and pressure under normal usage, a white flake built up on the surface and image artifacts occurred. Also, a noticeable loss of release properties was observed. It is believed the PTFE could not hold within the overcoat. There is a need for an additive to reinforce the integrity of this type fluoropolymer overcoat.

SUMMARY OF THE INVENTION

In accordance with the present invention, a priming composition useful for reinforcing a low surface energy layer containing a crystalline, semicrystalline, or amorphous fluorocarbon polymeric material to a metallic or an organic polymeric substrate comprises about 98 to 99.9 weight percent of the coating mixture and about 0.1 to 2 weight percent of a perfluoroalkylsubstituted fluororesin-reactive compound.

The perfluoroalkylsubstituted fluororesin-reactive compound has the formula

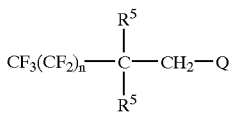

where $R^5$ is H or F, Q is OH or $SiR^6R^7R^8$; $R^6$, $R^7$, and $R^8$ being independently selected from the group consisting of Cl, OH, an alkyl group containing 1 to about 4 carbon atoms, an alkoxy group containing 1 to about 4 carbon atoms, an acyloxy group containing 2 to about 4 carbon atoms, and an amino group containing 0 to about 4 carbon atoms; and n is an integer from 1 to about 15; with the proviso that, at least one of $R^6$, $R^7$, and $R^8$ is Cl, OH, or an alkoxy, acyloxy, or amino group.

Also in accordance with the present invention, a substrate to which a surface layer comprises a crystalline, semi-crystalline, or amorphous fluorocarbon polymeric material. The substrate comprises metal, woods, glass or

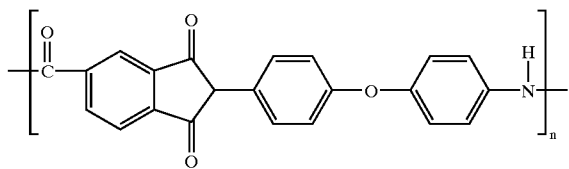

organic polymeric materials in the shape of a cylinder or, preferably, a seamless belt. The metal substrate can be steel, nickel, aluminum, copper and zinc, etc. The polymeric substrate can be either thermoplastics or thermosets.

The organic polymer binder which incorporated with the fluoropolymer can be selected from the group consisting of a polyester, a polycarbonate, a polyimide, a polyamide, a polyamide-imide, a fluorocarbon elastomer, a siloxane silicone rubber, ethylene-propylene rubber (EPR), a polyurethane, a polystylene-co-elastomer block copolymer. The preferred organic polymer binder is from polyamides, polyimides, polyamide-imides and mixtures of them.

The additive in the present invention interacts with both the polar organic polymer binder and the fluorocarbon polymers. It also improves the binding between the fluorocarbon polymers and the substrate due to the dual functionality of the additive. The coating with the present invention is characterised by good release and excellent integrity of the overcoat during the life of the coated parts.

DETAILED DESCRIPTION OF THE INVENTION

In accordance with the present invention, the overcoat composition can be used on various substrates for release, solvent resistance and heat resistance properties. The substrate can be metal, glass, wood, thermoplastic or thermoset resins, e.g. polyurethane, polyimide, polyamide, polyamide-imide, polyester, polyethylene, polycarbonate, silicone rubber, etc. The preferred substrate is polyimide, in the form of tube or belt. An important advantage of a polyimide as a substrate for the coated belt is that it can be fabricated as a seamless belt, thus avoiding the disadvantage of belts having seams for color proofing and electrophotographic fusing applications.

Polyimides useful as fusing belts substrate are disclosed in U.S. Pat. No. 5,411,779, which is incorporated herein by reference. As disclosed in the cited patent, the polyimide can be prepared in tubular or belt form by coating a poly(amic acid) solution on the inner circumference of a cylinder and imidizing the poly(amic acid) to form a tubular inner layer of the polyimide resin. The poly(amic acid) can be obtained by reacting a tetracarboxylic dianhydride or derivative thereof with an approximately equimolar amount of a diamine in an organic polar solvent. Examples of tetracarboxylic dianhydrides, diamines, solvents and reaction procedures are disclosed in the cited patent, especially in columns 4–6 and in the numbered examples.

The fluoropolymer resin layer consists of a fluoropolymer material, such as a semicrystalline fluoropolymer, a semicrystalline fluoropolymer or an amorphous fluoropolymer composite. Such materials include polytetrafluoroethylene (PTFE), polyperfluoroalkoxyl-tetrafluoroethylene (PFA), polyfluorinated ethylene-propylene (FEP), poly (ethylenetetrafluoroethylene), polyvinylfluoride, polyvinylidene fluoride, polychlorotrifluoroethylene (PCTFE), poly(ethylene-chloro-trifluoroethylene), 2,2-Bistrifluoromethyl-4,5-difluoro-1,3-dioxole (Teflon AF), and mixtures of fluoropolymer resins.

Some of these fluoropolymer resins are commercially available from DuPont as Teflon™. or Silverstone™ materials. The preferred fluoropolymer resin layer consists of PTFE, commercially available from Whitford under the trade name Xylan™ 1010. It is preferred because it is durable, abrasion resistant and forms a very smooth release layer.

The organic polymer binder for the fluoropolymer resin and the substrate layer consists of any polymers selected from the group consisting of a polyester, a polycarbonate, a polyimide, a polyamide, a polyamideimide, a fluorocarbon elastomer, a siloxane silicone rubber, ethylene-propylene rubber (EPR), a polyurethane, a polystylene-co-elastomer block copolymer. The preferred organic polymer binder is from polyamides, polyimides, polyamide-imides and mixtures of these as described below.

The overcoat can be the product of sintering an aqueous dispersion of fluoropolymer resin and a polymer binder selected from the group consisting of polyamic acids and polyamides. Generally, upon heating, polyamic acids undergo a condensation reaction to form different polymers, for example, polyimides, polyamide-imides, polyetherimides, polybenzoxyazoles, polybenzimidazoles, and polybenzthiazoles. (It is possible that some of the polyamic acids in the binder will have already undergone the condensation reaction before heating.) The preferred polyamic acids for use in the primer composition of this invention are those that are precursors to polyimides and polyamide-imides, that is polyamic acids that will form polyimides or polyamide-imides upon heating.

One way to form polyamic acids is by the reaction of an aromatic dianhydride and an aromatic amine in an aqueous solution. This reaction is tailored to produce polyamic acids that are precursors to the desired polymer, such as, polyimides or polyamide-imides. This reaction and others are well known in the art. See, Principles of Polymerization, 2nd Ed., George Odian, pp. 153–154, John Wiley & Sons, Inc. and Textbook of Polymer Science, 3rd Ed., Fred W. Billmyer, Jr., pp. 427–28, John Wiley & Sons, Inc. Many polyamic acids are commercially available. Examples of commercially available polyamic acids which form polyimides when cured include: Ultem™, Larc™, Avimid™ K 111, Exmid™ and Kapton™. An example of a polyamic acid that forms a polyamideimide when cured is Torlon™, available from Amoco. An example of a polyamic acid that forms a polyether-imide when cured is Ultem™ available from General Electric. The polyamic acids which are mixed with the fluoropolymer resins to form the binder layer material are and will be generally referred to by the polymers they produce when heated, such as, polyimides, or polyamide-imide; however, it is understood that the organic polymer binder mostly consists of the unreacted polyamic acids or polyamides until it is heated, at which time, it may consist of a polyimide, polyamide-imide or polyamide. The polymer binder is heated either after it is applied or preferably after the application of the fluoropolymer resin layer during the sintering of the fluoropolymer resin layer.

The fluoropolymer resins in the overcoat composition can be any of the previously disclosed fluoropolymer resins, such as, polytetrafluoroethylene, polyperfluoroalkoxy-tetrafluoroethylene, polyfluorinated ethylene-propylene. The preferred composition consists of 18 to 39.9 weight percent fluoropolymer resins preferably polytetrafluoroethylene, and 60 to 80 weight percent organic polymer binder, preferably polyamic acids, in an aqueous dispersion. The novel additive from this invention is in the amount of 0.1 to 2 weight percent of the fluoropolymer coating mixture. Preferable fluoropolymer coating mixture consists of a polyamide-imide-fluoropolymer resin which can be prepared by the A method taught in U.S. Pat. No. 4,087,394, which is incorporated herein by reference. The polyamide or polyimide and fluoropolymer resin mixture overcoat can be made similarly. The most preferable polyamide-imide-fluoropolymer resin mixture overcoat is Xylan™ 1010 supplied by Whitford.

In accordance with the present invention, the perfluoroalkylsubstituted fluororesin-reactive compound has the formula:

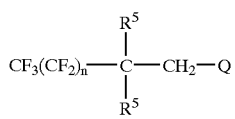

where $R^5$ is H or F, Q is OH or $SiR^6R^7R^8$; $R^6$, $R^7$, and $R^8$ being independently selected from the group consisting of Cl, OH, an alkyl group containing 1 to about 4 carbon atoms, an alkoxy group containing 1 to about 4 carbon atoms, an acyloxy group containing 2 to about 4 carbon atoms, and an amino group containing 0 to about 4 carbon atoms; and n is an integer from 1 to about 15; with the proviso that, at least one of $R^6$, $R^7$, and $R^8$ is Cl, OH, or an alkoxy, acyloxy, or amino group. The priming agent composition comprises the perfluoroalkylsubstituted fluororesin-reactive compound containing 7 to 21 fluorine atoms.

The priming agent composition of perfluoroalkylsubstituted fluororesin-reactive compound is selected from the group consisting of $CF_3(CF_2)_7CH_2CH_2Si(OC_2H_5)_3$, $CF_3(CF_2)_5 CH_2CH_2SiCH_3Cl_2$, $CF_3(CF_2)_8 CH_2CH_2OH$, $CF_3(CF_2)_9CH_2OH$ and mixture thereof.

The release coating layer composition is then comprise about 60 to 80% by weight of organic polymer binder, 18 to 39.9% by weight of fluorinated resin and about 0.1 to 2% by weight of said perfluoroalkylsubstituted fluororesin-reactive compound.

Improved integrity of the fluororesin coating is expected from current invention composition. The improvement was demonstrated by a method of laminating media that comprises the steps of passing a media to be laminated between first and second coated seamless belts which apply a first pressure to the media; and providing a second pressure to the media passing between the first and second coated seamless belts by way of first and second opposing pressure rollers respectively located within each of the first and second coated seamless belts. Both first and second pressure rollers are heated pressure rollers. A further step of providing a third pressure to the media passing between the first and second coated seamless belts is applied. It is done by way of positioning first and second plates with the first and second coated seamless belts. The current invention provides an improved coated laminator belt performance.

Methods for preparing the coating, testing and examples of the invention follow.

Materials

Heptadecafluoro-1,1,2,2,-tetrahydrodecyl-triethoxysilane (SIH5841-2) from
Gelest, Inc., Tullytown, Pa.
HCl from Aldrich, Milwaukee, Wis.
Tetrahydrofuran (THF)\99.9% anhydrous from Aldrich, Milwaukee, Wis. Xylan™ 1010 DF 870 Black from Whitford Corporation, West Chester, Pa. Polyimide belt from IST Co., Japan

EXAMPLE 1

Preparation of Additive and Coating Solution

Dilute HCl with water to 0.15N solution. To prepare the additive solution, dissolve 0.35 grams of SIH5841-2 to 6.7 grams THF. Let the solution stir for ten minutes. Add one drop of 0.1 5N HCl into the solution and stir for another ten minutes. The additive solution is then added into 100 grams of Xylan™ 1010 DF 870 black to form the coating solution.

EXAMPLE 2

Preparation of a Lamination Belt

The imide belt was air blustered to clean any dirt and hung on a rotational rod. Coating solution from example 1 was applied by a spray gun and sprayed uniformly onto the belt surface by two passes with the imide belt rotated on the rotational rod. After the coating was applied, the coated belt was cured at 350° F. for 30 minutes. A smooth coating with 30–40 µm thickness formed after curing.

EXAMPLE 3

Lamination Belt Test

The coated belts were mounted on Kodak Approval 800 Laminator for online lamination testing. The belts were idling under 150° C. and pressure for seven days. Meanwhile, different types of media were passing through the laminator for release test. Excellent release property was observed.

The invention has been described in detail with particular reference to certain preferred embodiments thereof, but it will be understood that variations and modifications can be effected within the spirit and scope of the invention.

What is claimed is:

1. A release coating layer composition comprising:
   a) a continuous phase of an organic polymer binder;
   b) a discontinuous phase of a fluorinated resin having a molecular weight between 2500 and 10,000,000, wherein the ratio of organic polymer binder to fluorinated resin is between 60:39.9 to 80:18 by weight; and
   c) a perfuoroalkylsubstituted fluororesin reactive compound having the formula:

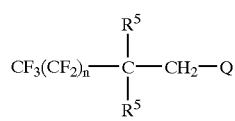

where $R^5$ represents H or F, and n represents an integer from 1 to about 15.

2. The release coating layer composition of claim 1 wherein the fluorinated resin is selected from the group consisting of polytetrafluoroethylene (PTFE), polyperfluoroalkoxyl-tetrafluoroethylene (PFA), polyfluorinated ethylene-propylene (FEP), poly(ethylenetetrafluoroethylene), polyvinylfluoride, polyvinylidene fluoride, polychlorotrifluoroethylene (PCTFE), poly(ethylenechloro-trifluoroethylene), 2,2-bistrifluoromethyl-4,5-difluoro-1,3-dioxole (Teflon AF), and mixtures thereof.

3. The release coating layer composition of claim 1 comprising about 60 to 80% by weight of said organic polymer binder, 18 to 39.9% by weight of said fluorinated resin, and about 0.1 to 2% by weight of said perfluoroalkyl-substituted fluororesin reactive compound.

4. The release coating layer composition of claim 1 wherein said organic polymer binder is selected from the group consisting of a polyester, a polycarbonate, a polyimnide, a polyamide, a polyamideimide, a fluorocarbon elastomer, a siloxane silicone rubber, ethylene-propylene rubber (EPR), a polyurethane, and polystyrene-co-elastomer block copolymer.

5. The release coating layer composition of claim 1 wherein the perfluoroalkylsubsituted fluororesin reactive compound contains 7 to 21 fluorine atoms.

6. The release coating layer composition of claim 1 wherein said perfluoroalkylsubstituted fluororesin reactive compound is selected from the group consisting of $CF_3(CF_2)_8CH_2CH_2OH$, $CF_3(CF_2)_9CH_2OH$, and mixtures thereof.

7. The release coating layer composition of claim 1 wherein said organic polymer binder, said fluorinated resin, and said perfluoroalkylsubstituted fluororesin reactive compound are contained in a single coating solution.

8. A lamination belt comprising a release coating layer formed from the release coating layer composition of claim 1.

* * * * *